(12) United States Patent
Thapliya et al.

(10) Patent No.: US 7,403,678 B2
(45) Date of Patent: Jul. 22, 2008

(54) OPTICAL SWITCHING ELEMENT

(75) Inventors: Roshan Thapliya, Ebina (JP);
Shigetoshi Nakamura, Ebina (JP);
Takashi Kikuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/605,348

(22) Filed: Nov. 29, 2006

(65) Prior Publication Data
US 2007/0263953 A1    Nov. 15, 2007

(30) Foreign Application Priority Data
May 12, 2006   (JP)   .............. 2006-134237

(51) Int. Cl.
  *G02B 6/42* (2006.01)
  *G02B 6/10* (2006.01)
  *G02F 1/295* (2006.01)

(52) U.S. Cl. .............. 385/20; 385/8; 385/40; 385/129

(58) Field of Classification Search ............. 385/16–23, 385/4, 8, 9, 15, 39–42, 129–132
See application file for complete search history.

(56) References Cited
U.S. PATENT DOCUMENTS
4,127,320 A * 11/1978 Li .................. 385/9

2005/0175281 A1* 8/2005 Thapliya et al. .......... 385/28
2006/0268395 A1* 11/2006 Steckl et al. ........... 359/341.1

FOREIGN PATENT DOCUMENTS
JP    A 11-84434    3/1999

* cited by examiner

*Primary Examiner*—Charlie Peng
(74) *Attorney, Agent, or Firm*—Oliff & Berridge, PLC

(57) ABSTRACT

An optical switching element comprising: a multimode waveguide having an electro-optical effect; one or a plurality of first single mode waveguides; a plurality of second single mode waveguides; a first electrode arranged in the vicinity of one edge on one side of the multimode waveguide; a second electrode arranged in the vicinity of the other edge on the same side of the multimode waveguide; and a third electrode arranged on the other side of the multimode waveguide, over the first electrode and the second electrode being arranged so as to be positioned on bright spots formed by multimode interference in an optical mode field generated by the light propagating through the multimode waveguide, and an optical path being switched between the first single mode waveguide and the second single mode waveguide by applying voltage between the first electrode and the third electrode and between the second electrode and the third electrode, is provided.

8 Claims, 23 Drawing Sheets

FIG.11
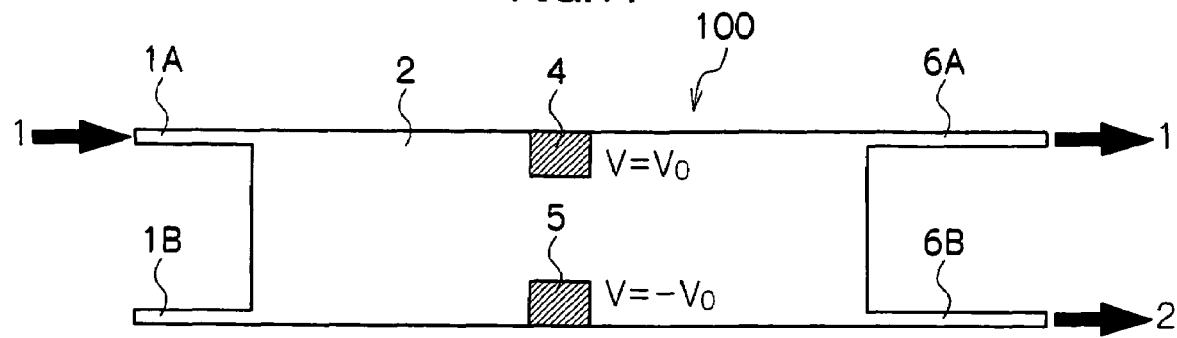
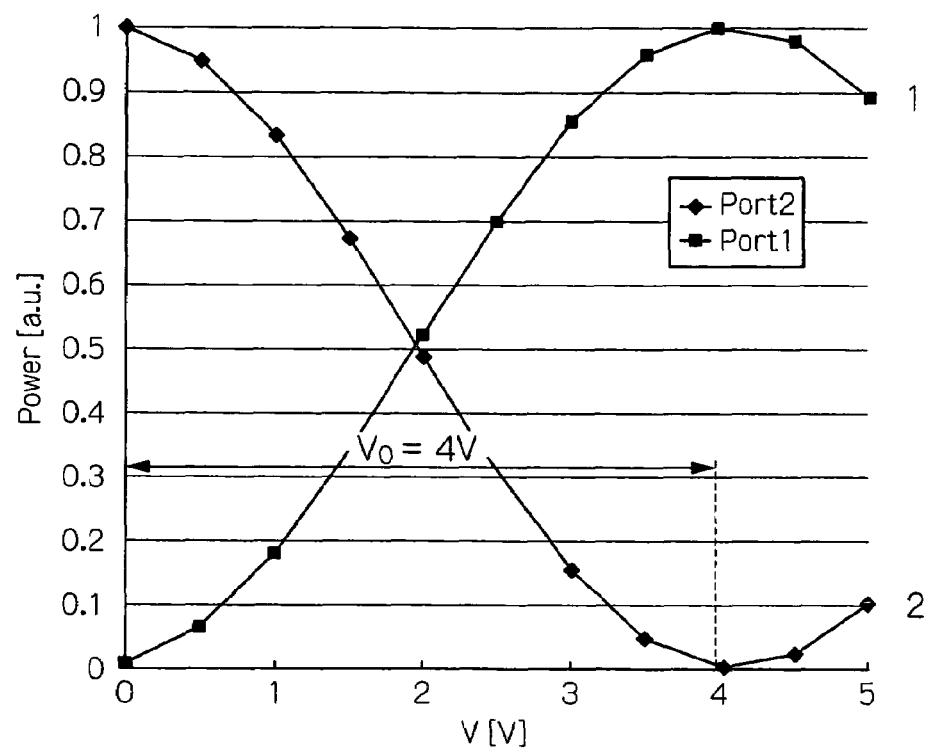

US 7,403,678 B2

OPTICAL SWITCHING ELEMENT

BACKGROUND

1. Technical Field

The present invention relates to optical switching elements, more specifically, to an optical switching element capable of switching an optical path at low operating voltage.

2. Related Art

The optical switching element having a rigid structure and operating at high speed at low operating voltage is required to build the next generation of optical data links. The traditional optical switching elements are structurally fragile since a Y-shaped branching path or an optical path switching coupler is generally used.

On the other hand, a multimode interference (MMI) that utilizes the interference of light is robust to unintentional alteration in refractive index and assembly failure and is a promising technology for the future, but traditionally, MMIs have only been used as passive elements in optical switching elements.

SUMMARY

According to an aspect of the present invention, there is provided: an optical switching element comprising: a multimode waveguide for propagating multimode light and having an electro-optical effect; one or a plurality of first single mode waveguides connected to one end of the multimode waveguide; a plurality of second single mode waveguides connected to the other end of the multimode waveguide; a first electrode arranged in the vicinity of one edge on one side of the multimode waveguide; a second electrode arranged in the vicinity of the other edge on the same side of the multimode waveguide; and a third electrode arranged on the other side of the multimode waveguide, over the first electrode and the second electrode being arranged so as to be positioned on luminescent spots formed by multimode interference in an optical mode field generated by the light propagating through the multimode waveguide, and an optical path being switched between the first single mode waveguide and the second single mode waveguide by applying voltage between the first electrode and the third electrode and between the second electrode and the third electrode.

BRIEF DESCRIPTION OF THE DRAWINGS

An exemplary embodiment of the present invention will be described in detail based on the following figures, wherein:

FIG. 11 is a graph showing the alteration in the intensity of light outgoing from the respective outgoing waveguides when the voltage applied to the first electrode and the voltage applied to the second electrode are changed in the optical switching element according to the first embodiment;

DETAILED DESCRIPTION

Embodiment

Optical Switching Element (1) Configuration

Figure 1:
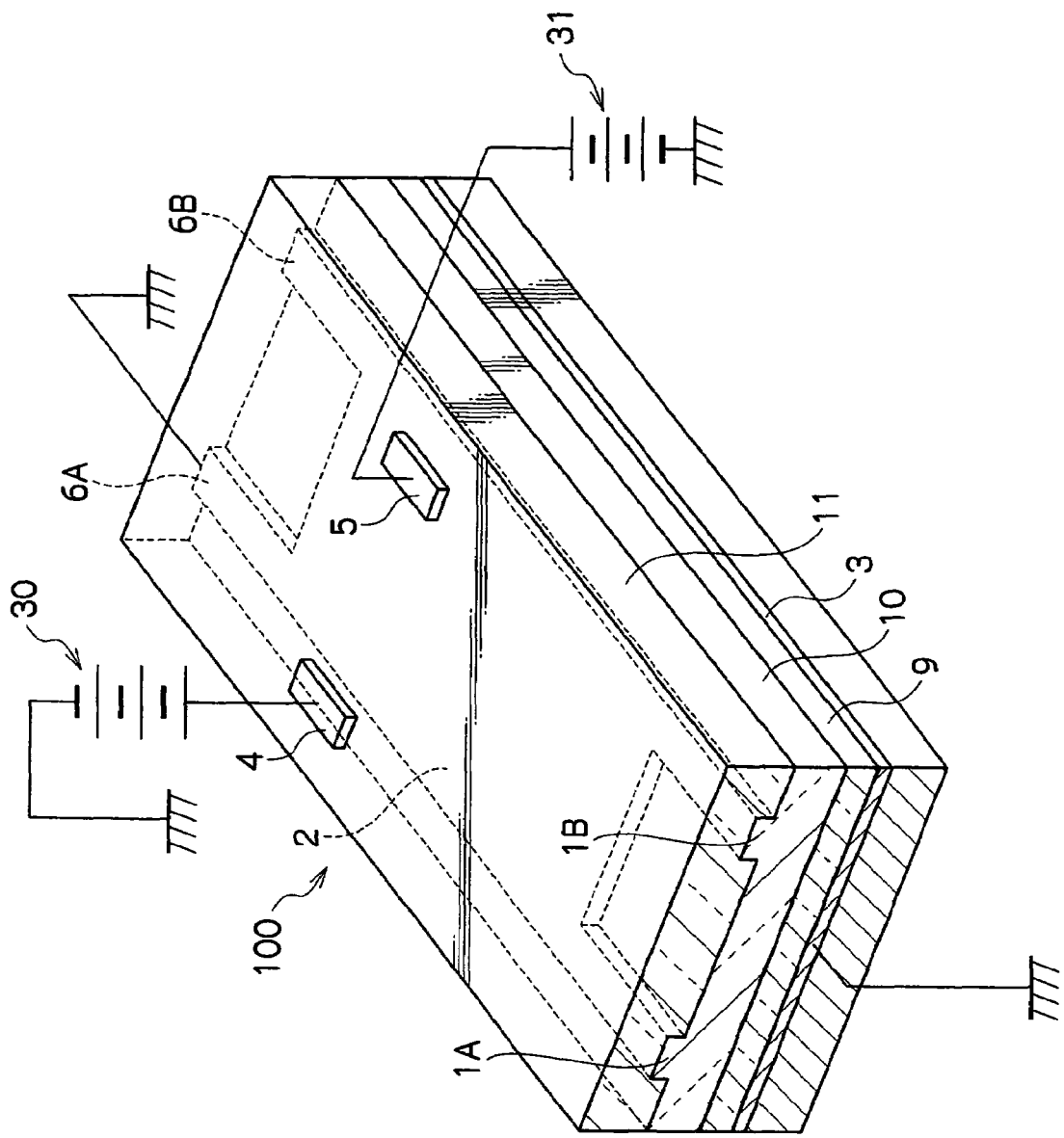
FIG. 1 is a perspective view showing an over-all configuration of an optical switching element according to a first embodiment.

As shown in FIGS. 1 to 5, an optical switching element 100 according to a first embodiment includes a rectangular multimode waveguide 2; two incident waveguides 1A and 1B (hereinafter collectively referred to sometimes as "incident waveguides 1") connected to one end of the multimode waveguide 2; two outgoing waveguides 6A and 6B (hereinafter collectively referred to sometimes as "outgoing waveguides 6") connected to the other end of the multimode waveguide 2; a first electrode 4 and a second electrode 5 arranged above the multimode waveguide 2; and a third electrode 3 arranged below the multimode waveguide 2. The incident waveguides 1A and 1B correspond to a first single mode waveguide in the present invention, and the outgoing waveguides 6A and 6B correspond to a second single mode waveguide in the present invention.

The incident waveguides 1, the outgoing waveguides 6, and the multimode waveguide 2 are integrally formed with a core layer 10 sandwiched between a lower cladding layer 9 and an upper cladding layer 11. The core layer 10 has a larger refractive index than both of the lower cladding layer 9 and the upper cladding layer 11. The refractive indexes of the lower cladding layer 9 and the upper cladding layer 11 may be the same or may be different. The lower cladding layer 9 is formed on the surface of a substrate 7, and the third electrode 3 is formed between the lower cladding layer 9 and the substrate 7. The first electrode 4 and the second electrode 5 are formed on the upper surface of the upper cladding layer 11. It is preferable to form a dielectric layer on the upper side of the upper cladding layer 11, and form the first electrode 4 and the second electrode 5 on the upper surface of the dielectric layer instead of forming the first electrode 4 and the second electrode 5 directly on the upper surface of the upper cladding layer 11, since the optical path can then be switched with a lower driving voltage.

Figure 2:
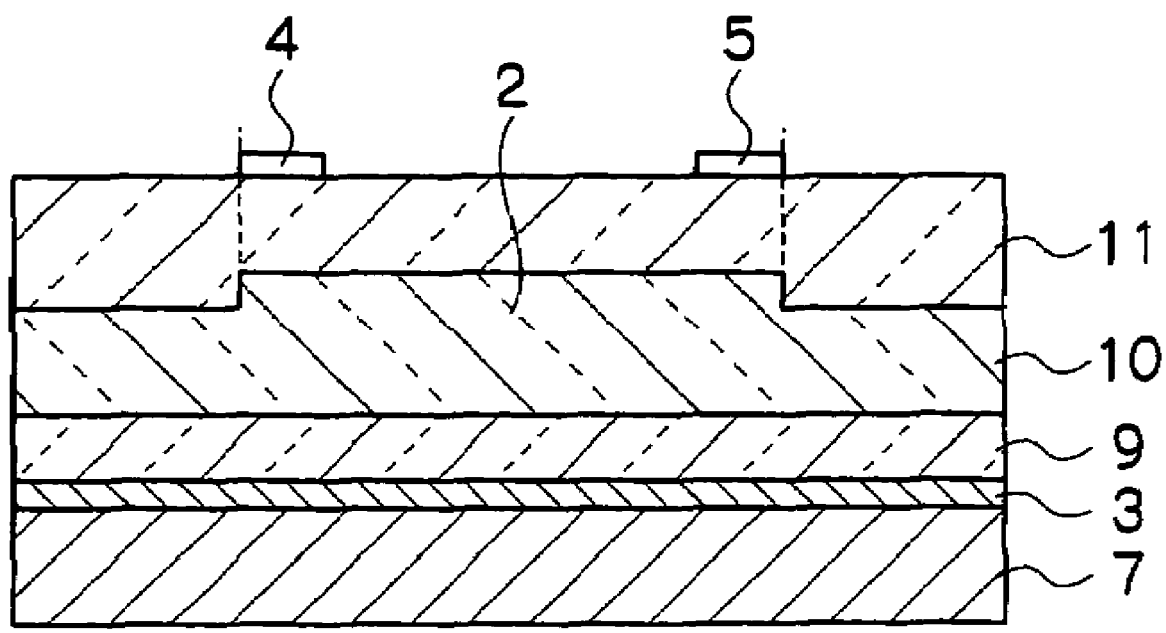
FIG. 2 is a cross sectional view in which the optical switching element shown in FIG. 1 is taken along a width direction of the multimode waveguide.
Figure 3:
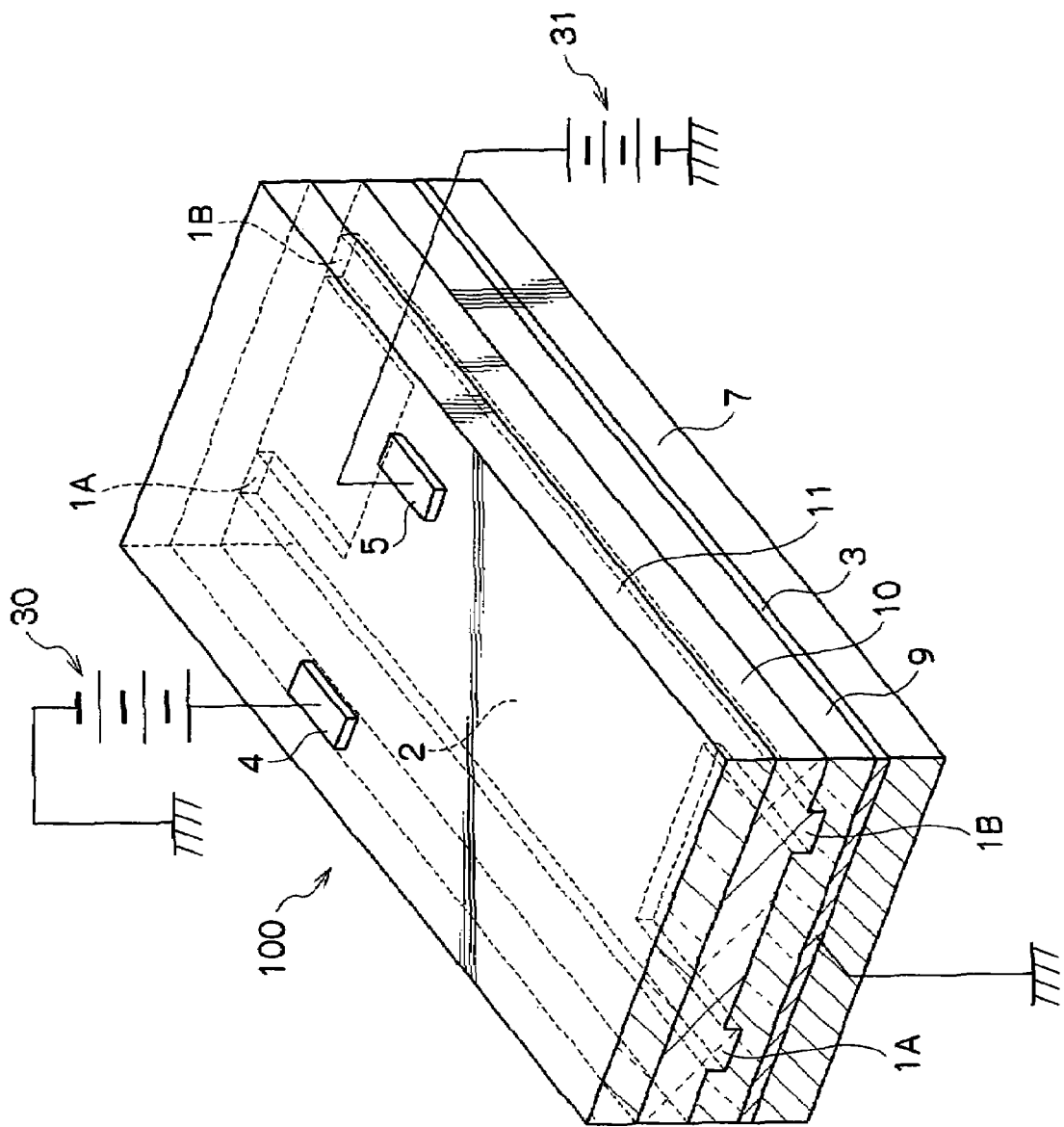
FIG. 3 is a perspective view showing an over-all configuration of another example of the optical switching element according to the first embodiment.
Figure 4:
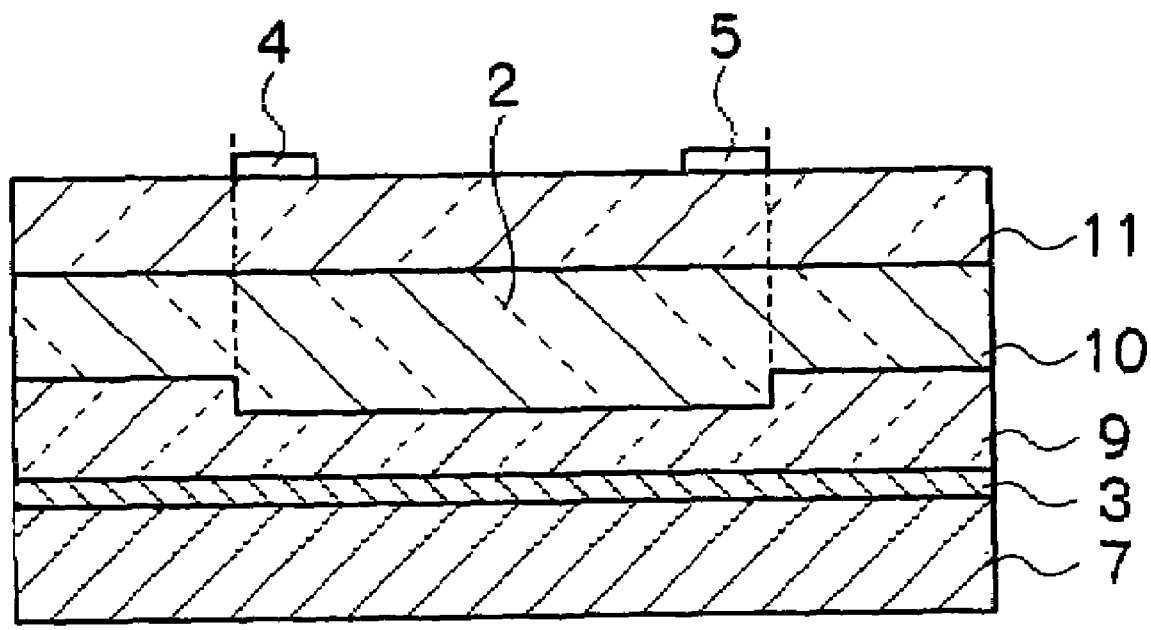
FIG. 4 is a cross sectional view in which the optical switching element shown in FIG. 3 is taken along the width direction of the multimode waveguide.

The incident waveguides 1, the outgoing waveguides 6 and the multimode waveguide 2 may be waveguides of rib structure that project in a rib form towards the upper cladding layer 11 as shown in FIGS. 1 and 2, or may be waveguides of an inverse rib structure that project in a rib form toward the lower cladding layer 9 as shown in FIGS. 3 and 4, but as long as the waveguides are formed as waveguides of a rib structure, a large electric field is generated at the core layer 10, specifically at the multimode waveguide 2, by a modulation signal applied to the first electrode 4 and the second electrode 5, and thus the light can be modulated more efficiently in the multimode waveguide 2 even if the modulation signal has a low voltage. If the incident waveguides 1, the outgoing waveguides 6 and the multimode waveguide 2 cannot be formed by etching the core layer 10 for some reason to form the incident waveguides 1, the outgoing waveguides 6 and the multimode waveguide 2 as the waveguides of inverse rib structure, the lower cladding layer 9 is etched to a predetermined shape, flow casting of a forming solution for forming the core layer 10 is performed, and then heating and curing are performed.

Figure 5:
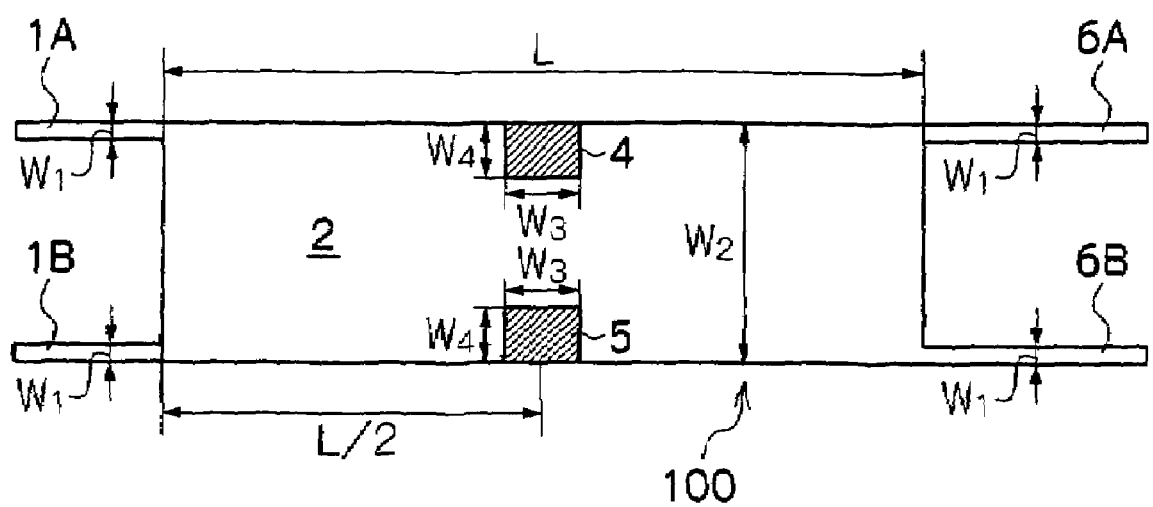
FIG. 5 is a plane view showing a relative positional relationship of an incident waveguide, a multimode waveguide, an outgoing waveguide, a first electrode and a second electrode in the optical switching element according to the first embodiment.

The incident waveguides 1 and the exit waveguides 6 have the same width $W_1$ as shown in FIG. 5. The width $W_2$ of the multimode waveguide 2 preferably satisfies the following relational expression:

$$1 < W_2/W_1 < 100$$

to perform stable multimode transmission in the multimode waveguide 2.

The length L of the multimode waveguide 2 is set as a function of the difference $\Delta n$ between the refractive index $n_2$ of the lower cladding layer 9 and the upper cladding layer 11 and the refractive index $n_1$ of the core layer 10; the width $W_1$ of the incident waveguides 1 and the outgoing waveguides 6; and the width $W_2$ of the multimode waveguide 2.

Figure 6:
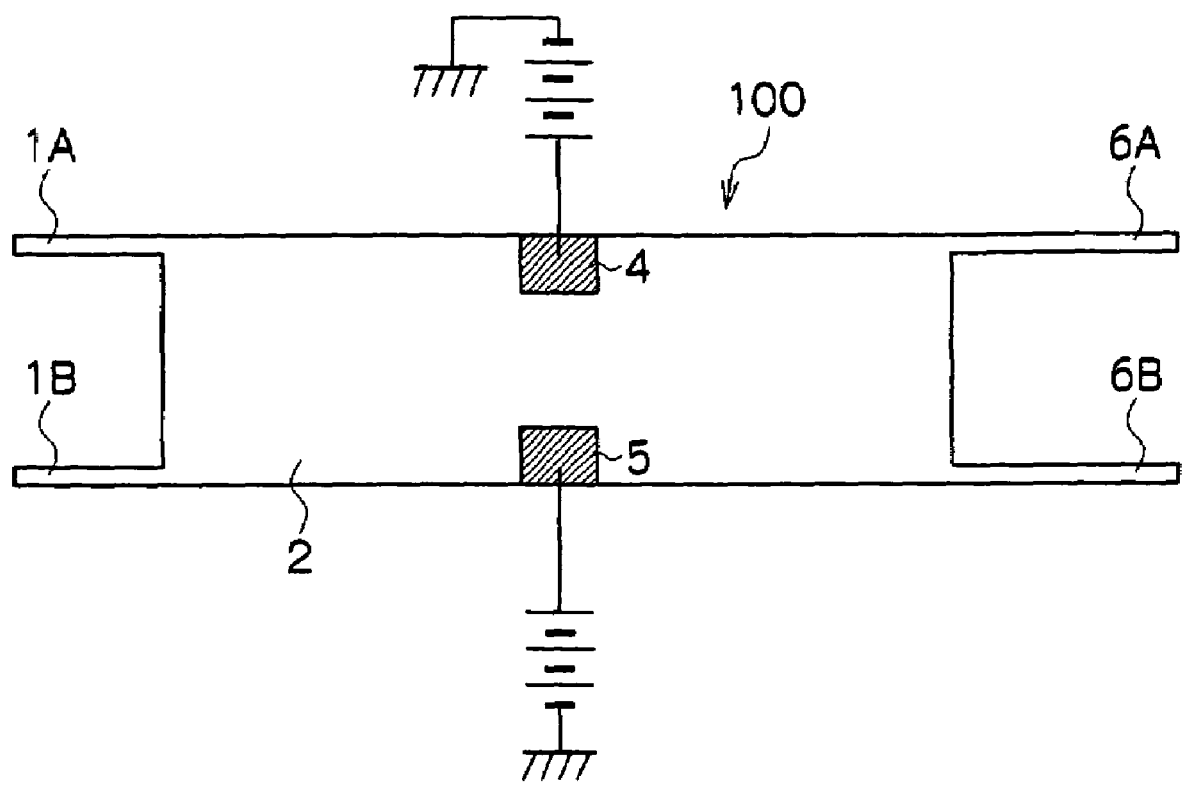
FIG. 6 is a plane view showing a state in which the voltage is applied to the first electrode and the second electrode of the optical switching element according to the first embodiment.

The multimode waveguide 2 is given an electro-optical cure by performing polarization orientation process with a predetermined voltage being applied. The polarization orientation process may be performed by applying the voltage with the same polarity to the entire multimode waveguide 2, or may be performed by applying the voltages with opposite polarity to the respective areas divided by the center line along the longitudinal direction of the multimode waveguide 2 as the boundary, as shown in FIG. 6.

The first electrode 4 and the second electrode 5 are arranged above the multimode waveguide 2 at the surface of the upper cladding layer 11, as shown in FIGS. 1 to 5. The first electrode 4 and the second electrode 5 are both arranged so as to be positioned above the luminescent spot formed by multimode interference in the optical mode field generated inside the multimode waveguide 2 by the light entering from the incident waveguide 1A and/or the incident waveguide 1B, in other words above, the luminescent spot formed by multimode interference produced when the light interfere with each other inside the multimode waveguide 2. The first electrode 4 is formed so as to cover the multimode waveguide 2 from one side edge forming a long side of the multimode waveguide 2 towards the center part, and the second electrode 5 is formed so as to cover the multimode waveguide 2 from the other side edge also forming a long side of the multimode waveguide 2 towards the center part. One of each of the first electrode 4 and the second electrode 5 may be arranged one of each, as shown in FIGS. 1 to 4, or two of each may be arranged as shown in FIG. 14, or three of each may be arranged. When one each of the first electrode 4 and the second electrode 5 are arranged, the electrodes are preferably positioned in exactly the middle between the ends of the multimode waveguide 2, as shown in FIGS. 4 and 5.

The dimension in the short side direction of the multimode waveguide 2 of the first electrode 4 and the second electrode 5, that is the width $W_4$, is less than ½ of the width $W_2$ of the multimode waveguide 2. Furthermore, the dimension in the longitudinal direction of the multimode waveguide 2 of the first electrode 4 and the second electrode 5, that is the length $W_3$, may be the same as or may be different from the width $W_4$, but is preferably shorter than the length L of the multimode waveguide 2.

The first electrode 4 and the second electrode 5 are connected to the direct current power sources 30 and 31, respectively. When the multimode waveguide 2 as a whole is subjected to polarization orientation process of the same polarity, the polarities of the direct current voltage applied from the direct current power sources 30 and 31 are opposite to each other, as shown in FIGS. 1, 3 and 6. When the multimode waveguide 2 is subjected to polarization orientation process of opposite polarity in the areas divided by the center line in the longitudinal direction as the boundary, a voltage of the same polarity can be applied to the first electrode 4 and to the second electrode 5, and thus both of the first electrode 4 and the second electrode 5 may be connected to one direct current power source 30, thereby simplifying the configuration of the voltage application circuit.

The material of the core layer 10, the upper cladding layer 11, and the lower cladding layer 9 may be any material as long as the material has an electro-optical effect in which the refractive index alters when an electric field is applied thereto, and is transparent with respect to the light to be modulated, such as: translucent polymeric materials such as acrylic resin, epoxy resin, polyethylene terephthalate resin, polycarbonate resin, polyurethane resin, polyimide resin, fluorinated polyimide resin, polyetherimide resin, polysulfone resin, polyethersulfone resin, polyarylate resin or polysiloxane resin; or silicon dioxide, various glasses, strontium titanate, gallium arsenide, indium phosphide or the like. When using a translucent polymer, it is preferable that a dye with an electro-optical effect is dispersed or a group with non-linear optical effect is bonded to the principal chain or the side chain so as to exhibit a non-linear optical effect.

Various metal materials and metal oxides known as electrode materials, such as aluminum, titanium, gold, copper, and ITO, can be given as examples of the material of the first electrode 4, the second electrode 5, and the third electrode 3.

(2) Forming Procedures

Figure 19:
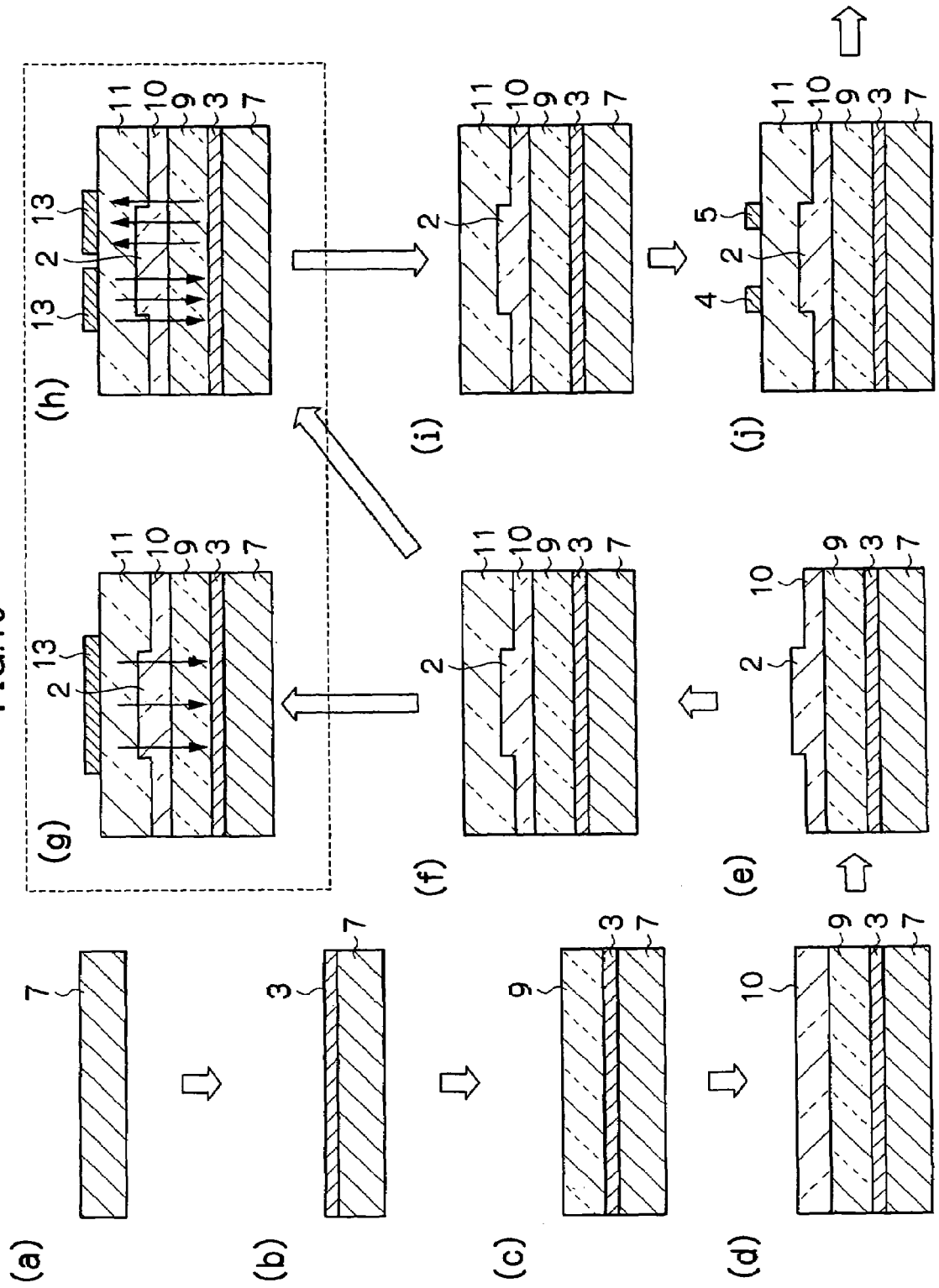
FIG. 19 is a flow chart illustrating the procedures for forming the optical switching element of the first embodiment.

The optical switching element 100 is formed through the procedures shown in FIG. 19.

First, as shown in FIG. 19(a), the substrate 7 is prepared. The substrate 7 may be a substrate made of an arbitrary material such as a glass substrate, a quartz substrate, a silicon substrate, a polyimide substrate and the like. The adhesiveness with the third electrode 3 can be enhanced by applying silane coupling agent to the substrate 7.

As shown in the FIG. 19(b), the third electrode 3 is formed on the surface of the substrate 7. The third electrode 3 may be formed by depositing or plating metal such as aluminum, titanium, gold, copper and the like on the surface of the substrate 7, or may be formed by attaching foils of these metals.

After the third electrode 3 is formed, the lower cladding layer 9 is formed on the surface of the third electrode 3 as shown in FIG. 19(c). First, a solution of translucent polymer for forming the lower cladding layer 9 is applied to the surface of the third electrode 3. The method of applying the solution to the third electrode 3 includes curtain coating method, extrusion coating method, roll coating method, spin coating method, dip coating method, bar coating method, spray coating method, slide coating method, print coating method and the like. After applying the solution of the above material to the first substrate, the solvent is removed through heating, and then reacted and cured, as necessary to form the lower cladding layer 9.

As shown in FIG. 19(d), the core layer 10 is formed on the surface of the lower cladding layer 9. For example, the core layer 10 is formed by applying a solution of translucent polymer forming the core layer 10 to the surface of the lower cladding layer 9, and then performing heating and curing. The method of applying the solution may be the methods similar to those described with respect to the lower cladding layer 9.

After the core layer 10 is formed, the waveguides such as the incident waveguides 1, the outgoing waveguides 6 and the multimode waveguide 2 and the like are formed on the core layer 10, as shown in FIG. 19(e). The means for forming the waveguide includes means such as etching. The waveguide may be formed by forming a concave part with the shape corresponding to the waveguide on the lower cladding layer 9, applying the solution of translucent polymer from above, and then performing heating and curing.

As shown in FIG. 19(f), the upper cladding layer 11 is formed on the core layer 10. The upper cladding layer 11 may be formed through the procedures similar to the formation of the lower cladding layer 9 and the core layer 10.

Figure 7:
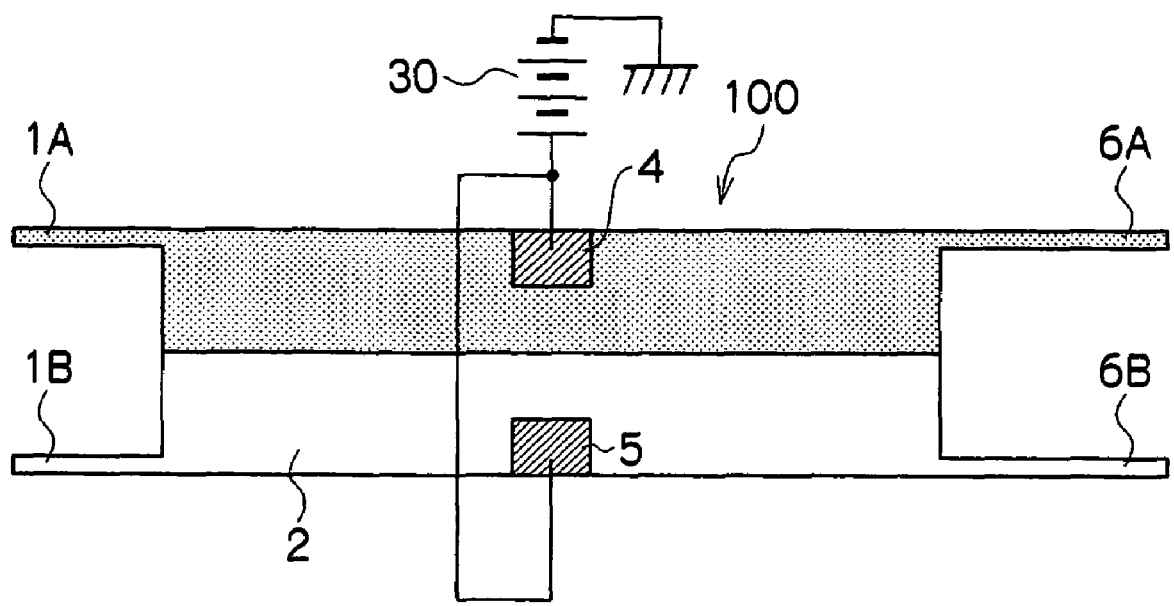
FIG. 7 is a plane view showing a state in the optical switching element according to the first embodiment in which the voltage is applied to the first electrode and the second electrode when the multimode waveguide is performed with a polarization orientation process with opposite polarities in areas divided with the center line in the longitudinal direction as the boundary.

After the upper cladding layer 11 is formed, a seed electrode 13 made of metal membrane is formed on the surface of the upper cladding layer 11, as shown in FIGS. 19(g) and FIG. 19(h). The seed electrode 13 is formed similarly to the third electrode 3. The third electrode 3 is then grounded, a predetermined positive voltage is applied to the seed electrode 13 to apply electric field to the core layer 10, and the polarization orientation process is performed on the portions formed with the incident waveguide 1, the outgoing waveguides 6 and the multimode waveguide 2 of the core layer 10. A single seed electrode 13 may be formed above the multimode waveguide 2 as shown in FIG. 19(g), or two seed electrodes 13 may be formed along the width direction of the multimode waveguide 2 as shown in FIG. 19(h). The multimode waveguide 2 is uniformly performed with the polarization orientation process by forming a single seed electrode 13 above the multimode waveguide 2 as shown in FIG. 19(g) and applying the direct current voltage thereto. The multimode waveguide 2 may be performed with polarization orientation process of opposite polarity in the areas divided by the center line in the longitudinal direction as the boundary as shown in FIG. 7 by forming two seed electrodes 13 along the width direction of the multimode waveguide 2 as shown in FIG. 19(h) and applying the direct current voltage of opposite polarity to each seed electrode 13.

After the multimode waveguide 2 is performed with the polarization orientation process, the seed electrode 13 is removed by means of etching and the like as shown in FIG. 19(i). The first electrode 4 and the second electrode 5 are then formed on the upper cladding layer 11, as shown in FIG. 19(j). The first electrode 4 and the second electrode 5 may be formed by etched to a predetermined shape, instead of removing, the seed electrode 13.

(3) Effect

Figure 8A:
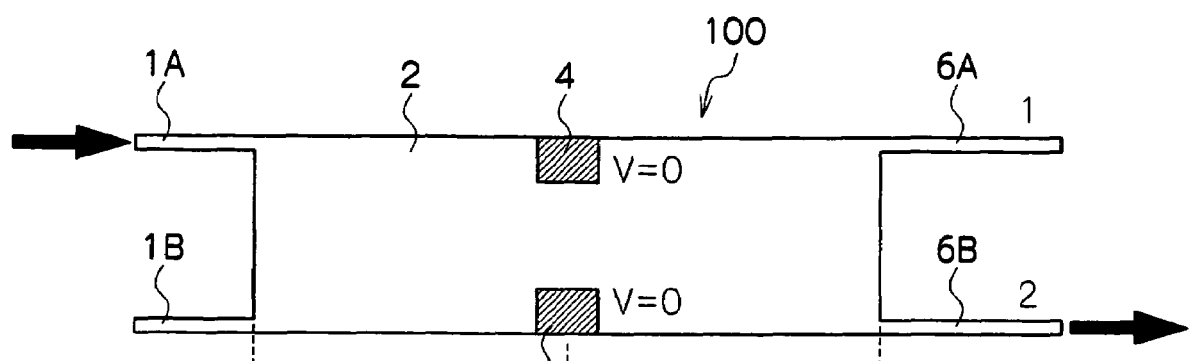
FIG. 8A is a plane view showing the optical path formed in the multimode waveguide when light is entered to one of the incident waveguides without the voltage applied to the first electrode and the second electrode in the optical switching element according to the first embodiment.
Figure 8B:
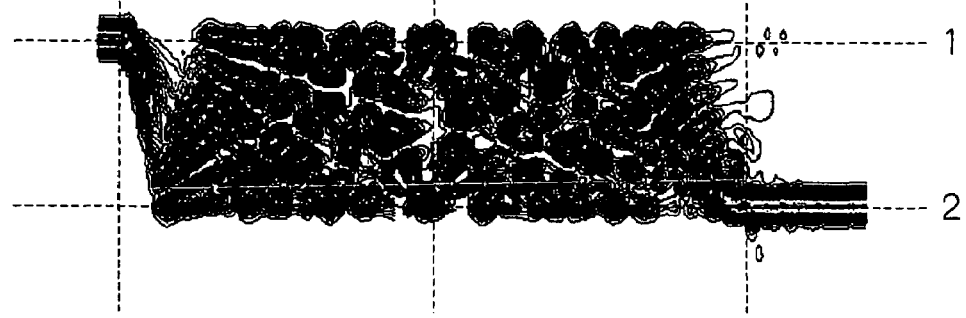
FIG. 8B is a plane view showing the distribution of an optical mode field in the multimode waveguide when light is entered to one of the incident waveguides without the voltage applied to the first electrode and the second electrode in the optical switching element according to the first embodiment.

As shown in FIG. 8A, when the light is entered from the incident waveguide 1A to the multimode waveguide 2 without a voltage applied to the first electrode 4 and the second electrode 5 of the optical switching element 100, the light propagated with a single mode through the incident waveguide 1 is separated into multimode light in the multimode waveguide 2, as shown in FIG. 8B. A light image is thereby generated at the connecting part of the incident waveguide 1 and the multimode waveguide 2. Since the light is propagated with multimode in the multimode waveguide 2, the light interfere with each other inside the multimode waveguide 2 and generate an optical mode field, and a light image shown in FIG. 8B is formed inside the multimode waveguide 2. The light image has plural luminescent spots. One of the luminescent spots formed by multimode interference is generated at a position where the first electrode 4 is arranged, and another luminescent spot formed by multimode interference is generated at a position where the second electrode 5 is arranged.

The light propagated with multimode through the multimode waveguide 2 converges to single mode light while interfering with each other at the connecting part of the multimode waveguide 2 and the outgoing waveguide 6B, a light image is then produced at the connecting part, and light with substantially the same intensity as that of the light entered from the incident waveguide 1 exits to the outside through the outgoing waveguide 6B.

The voltages opposite to each other are applied to the first electrode 4 and the second electrode 5 such that the dipole moments opposite to each other, which are divided by the center line in the longitudinal direction as the boundary, are produced, in other words, such that the dipole moments opposite to each other are produced at the portion sandwiched between the first electrode 4 and the third electrode 3, and at the portion sandwiched between the second electrode 5 and the third electrode 3 in the multimode waveguide 2.

Figure 9A:
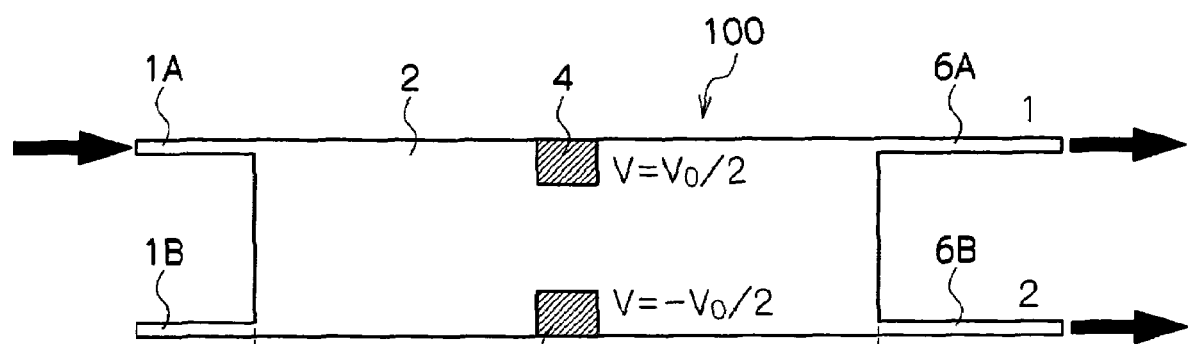
FIG. 9A is a plane view showing the optical path formed in the multimode waveguide when light is entered to one of the incident waveguides with the voltage $+V_0/2$ applied to the first electrode and the voltage $-V_0/2$ applied to the second electrode in the optical switching element according to the first embodiment.
Figure 9B:
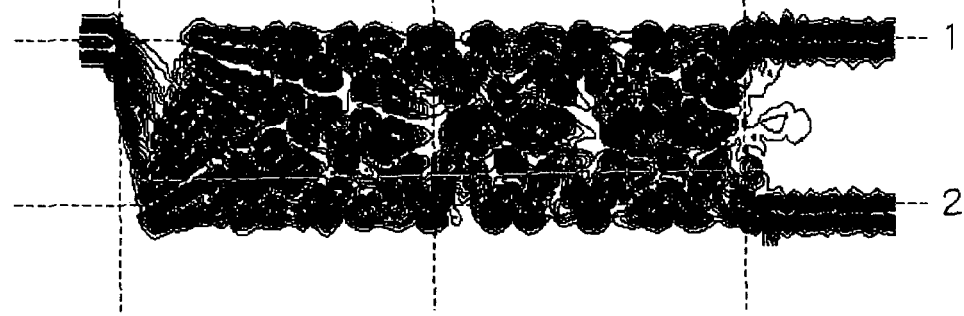
FIG. 9B is a plane view showing the distribution of an optical mode field in the multimode waveguide when light is entered to one of the incident waveguides with the voltage $+V_0/2$ applied to the first electrode and the voltage $-V_0/2$ applied to the second electrode in the optical switching element according to the first embodiment.
Figure 10A:
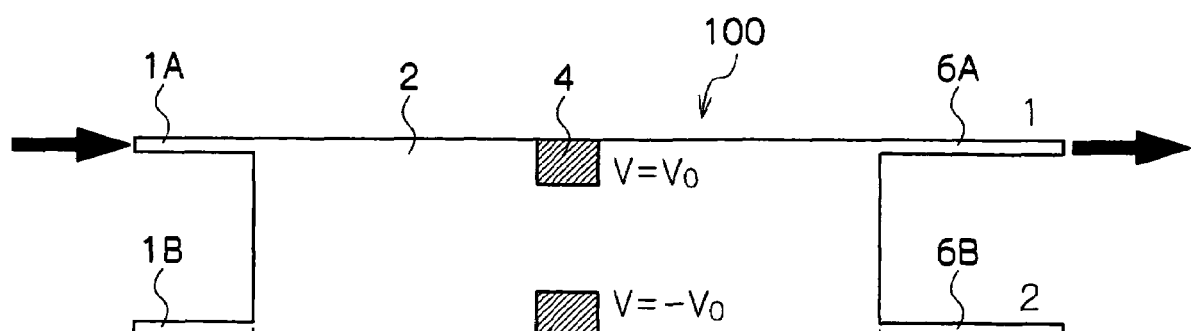
FIG. 10A is a plane view showing the optical path formed in the multimode waveguide when light is entered to one of the incident waveguides with the voltage $+V_0$ applied to the first electrode and the voltage $-V_0$ applied to the second electrode in the optical switching element according to the first embodiment.
Figure 10B:
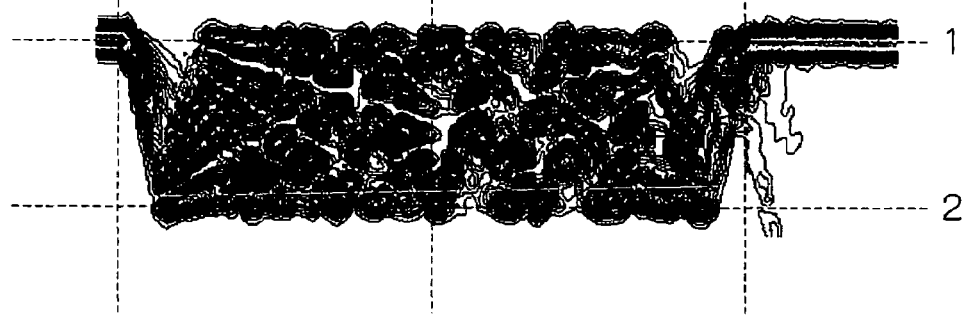
FIG. 10B is a plane view showing the distribution of an optical mode field in the multimode waveguide when light is entered to one of the incident waveguides with the voltage $+V_0$ applied to the first electrode and the voltage $-V_0$ applied to the second electrode in the optical switching element according to the first embodiment.

Since the multimode waveguide 2 is formed of a material with electro-optical effect, when the electric field is applied to the first electrode 4 and the second electrode 5, the refractive index of the multimode waveguide 2 alters, in particular, the refractive index greatly alters at the site where luminescent spots formed by multimode interference are generated. Therefore, the intensities of the luminescent spots formed by multimode interference at the sites where the luminescent spots formed by multimode interference have been produced up to this point lowers, and are eventually not produced. The distribution of the optical mode field inside the multimode waveguide 2 thereby alters. When the positive voltage is applied to the first electrode 4 and the negative voltage is applied to the second electrode 5, if the absolute value of the voltage applied to the first electrode 4 and the second electrode 5 is increased, the intensity of the light exiting from the outgoing waveguide 6B lowers as shown with a curve 2 in the graph of FIG. 11, and the intensity of the light exiting from the outgoing waveguide 6A increases as shown with a curve 1 in the graph. In the graph of FIG. 11, the horizontal axis shows the absolute value of the voltage applied to the first electrode 4 and the second electrode 5, and the vertical axis shows the intensity of the light exiting from the outgoing waveguides 6A and 6B. For example, if the voltage to be applied to the first electrode 4 is increased from 0(V) to $+V_0/2$ and the voltage to be applied to the second electrode 5 from 0(V) to $-V_0/2$, as shown in FIG. 9A, the light that entered from the incident waveguide 1A exits from the respective outgoing waveguides 6A and 6B at substantially the same intensity, as shown in FIG. 9B. When the voltage to be applied to the first electrode 4 is increased to $+V_0$ and the voltage to be applied to the second electrode 5 is increased to $-V_0$ as shown in FIG. 10A, the light that entered from the incident waveguide 1A does not exit from the outgoing waveguide 6B but exits from the outgoing waveguide 6A, as shown in FIG. 10B.

Figure 12A:
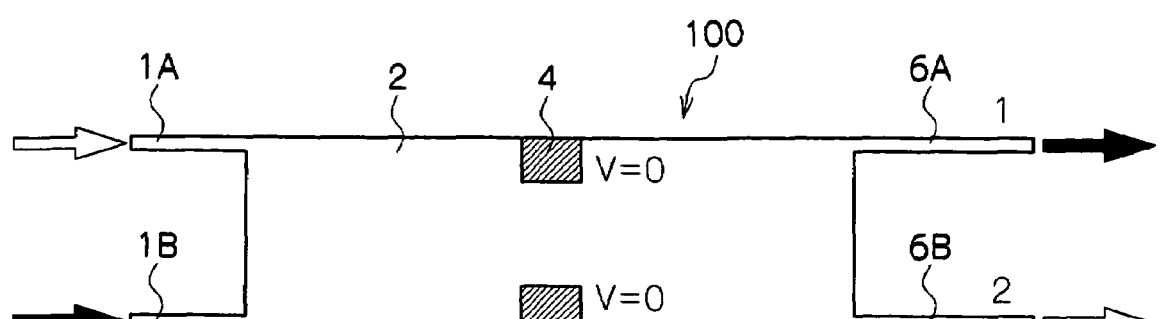
FIG. 12A is a plane view showing the optical path formed in the multimode waveguide when light is entered to both incident waveguides without the voltage applied to the first electrode and the second electrode in the optical switching element according to the first embodiment.
Figure 12B:
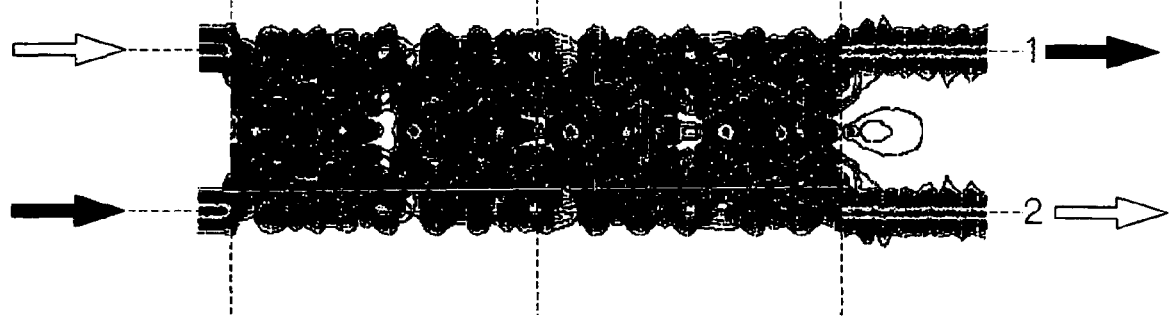
FIG. 12B is a plane view showing the distribution of an optical mode field in the multimode waveguide when light is entered to both incident waveguides without a voltage applied to the first electrode and the second electrode in the optical switching element according to the first embodiment.

As shown in FIG. 12A, when the light is entered to the multimode waveguide 2 from the incident waveguides 1A and 1B without a voltage applied to the first electrode 4 and the second electrode 5 of the optical switching element 100, light that enters from the incident waveguide 1A exits from the outgoing waveguide 6B and light that enters from the incident waveguide 1B exits from the outgoing waveguide 6A.

Figure 13A:
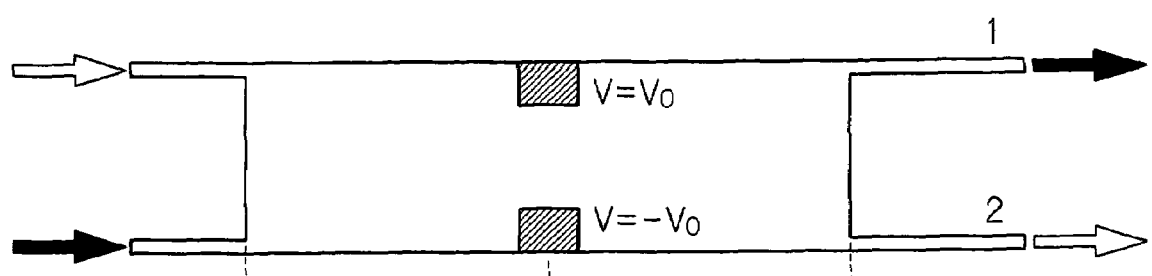
FIG. 13A is a plane view showing the optical path formed in the multimode waveguide when light is entered to both incident waveguides with the voltage $+V_0$ applied to the first electrode and the voltage $-V_0$ applied to the second electrode in the optical switching element according to the first embodiment.
Figure 13B:
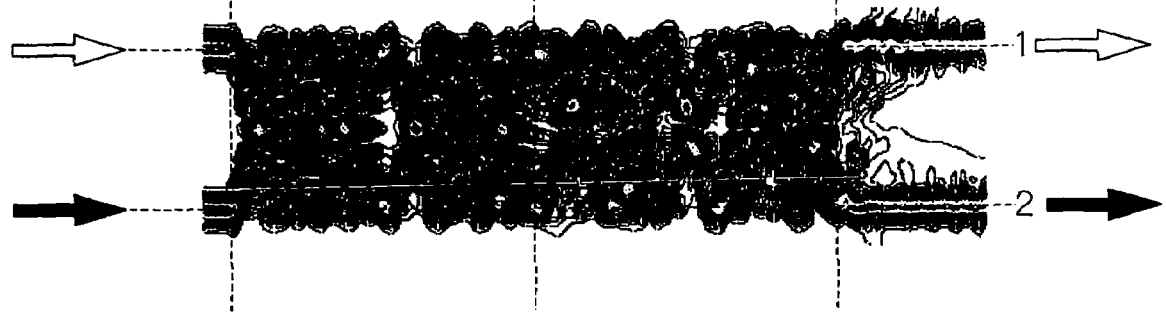
FIG. 13B is a plane view showing the distribution of the optical mode field in the multimode waveguide when light is entered to both incident waveguides with the voltage $+V_0$ applied to the first electrode and the voltage $-V_0$ applied to the second electrode in the optical switching element according to the first embodiment.

As shown in FIG. 13A, if the voltage of $+V_0(V)$ is applied to the first electrode 4 and the voltage of $-V_0(V)$ is applied to the second electrode 5, light that enters from the incident waveguide 1A exits from the outgoing waveguide 6A and light that enters from the incident waveguide 1B exits from the outgoing waveguide 6B, as shown in FIG. 13B.

Figure 14A:
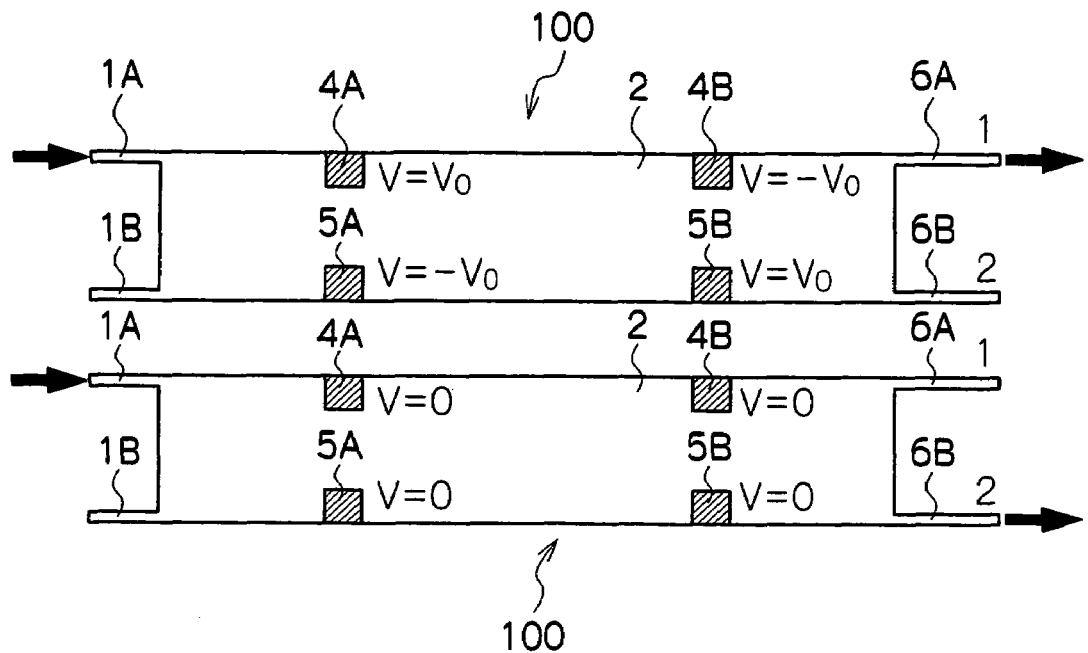
FIG. 14A is a plane view showing the optical paths formed in the multimode waveguides when light is entered to one of the incident waveguides respectively in a state where a voltage is not applied to the first electrode and the second electrode, and with a state where a positive voltage is applied to the first electrode and negative voltage is applied to the second electrode in the optical switching element according to the first embodiment, in the optical switching element formed with two of the first electrodes and two of the second electrodes along the longitudinal direction of the multimode waveguide.
Figure 14B:
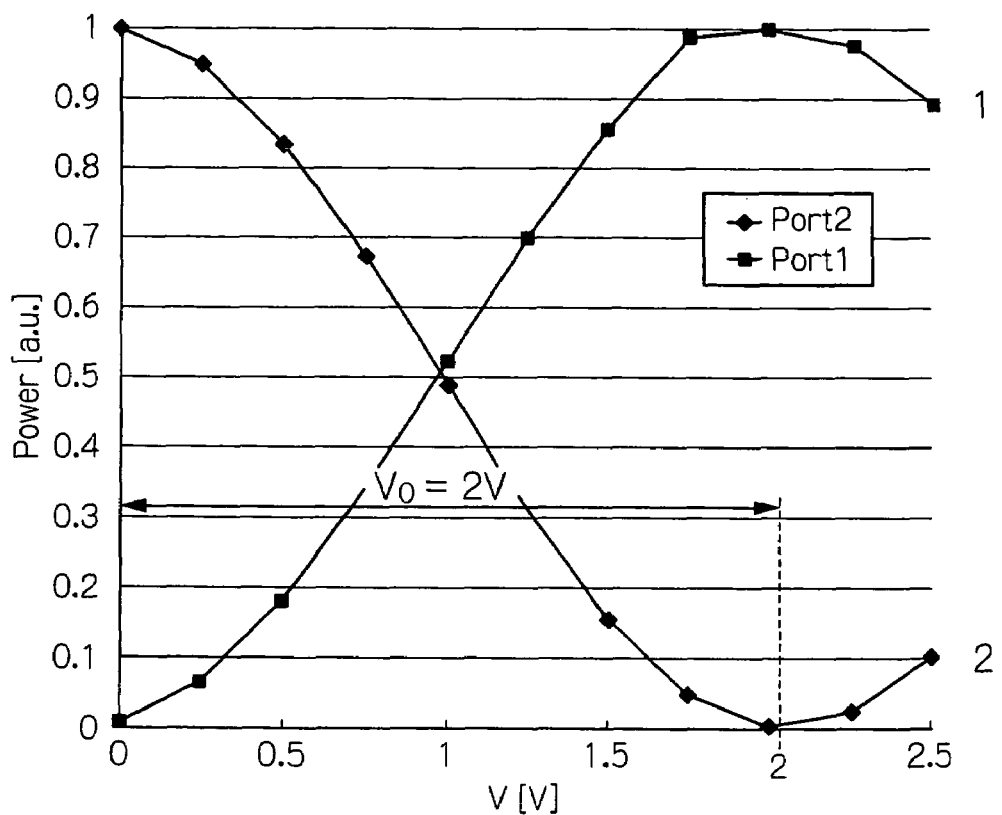
FIG. 14B is a graph showing the relationship between the absolute values of the voltages to be applied to the first electrode and the second electrode of FIG. 14A and the intensity of light outgoing from the respective outgoing waveguides.

Similarly, in the optical switching element 100, even if the first electrode 4 and the second electrode 5 are arranged two of each for example along the longitudinal direction of the multimode waveguide 2, as shown in FIG. 14A, the optical path of light that enters from the incident waveguide 1A can be switched from the outgoing waveguide 6B to the outgoing waveguide 6A by applying $+V_0$ to the first electrode 4 and $-V_0$ to the second electrode 5. Comparing the graph of FIG. 11 and the graph of FIG. 14B, the voltage necessary for switching the optical path is, for example 4(V) in FIG. 11, whereas the voltage is lowered by half to 2(V) in FIG. 14B. In the graph of FIG. 14B, the horizontal axis shows the absolute value of the voltage to be applied to the first electrode 4 and the second electrode 5, and the vertical axis shows the intensity of the light exiting from the outgoing waveguides 6A and 6B. Thus, the voltage necessary for switching the optical path can be lowered by arranging plural of the first electrodes 4 and the second electrodes 5 along the longitudinal direction of the multimode waveguide 2.

As described above, the optical path can be switched between the incident waveguides 1A and 1B and the outgoing waveguides 6A and 6B by controlling the voltage to be applied to the first electrode 4 and the second electrode 5 in the optical switching element 100.

(4) Features

Figure 15:
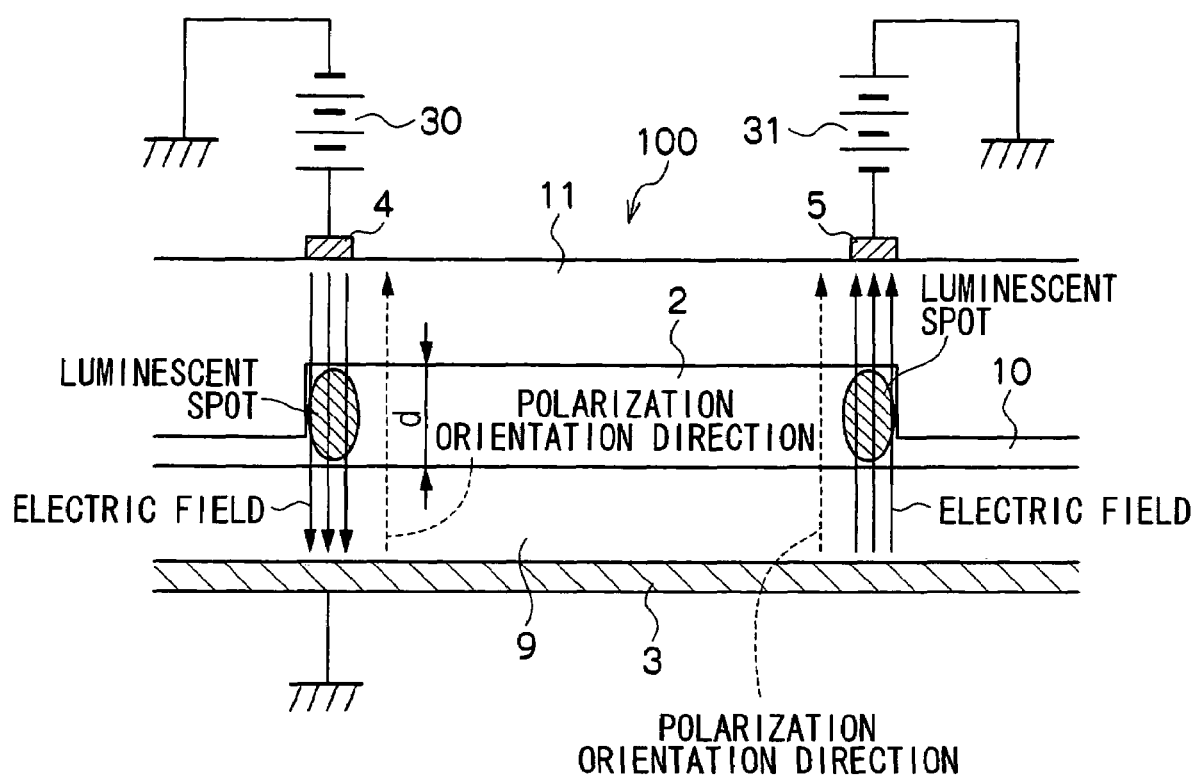
FIG. 15 is an explanatory view showing the positional relationship between the electric field generated by applying the voltage to the first electrode and the second electrode, and the luminescent spot formed by multimode interference produced in the multimode waveguide in the optical switching element of the first embodiment.

In the optical switching element 100, the electric fields with opposite directions are generated along the thickness direction between the first electrode 4 and the third electrode 3, and between the second electrode 5 and the third electrode 3, as shown in FIG. 15, by applying positive voltage to the first electrode 4 and negative voltage to the second electrode 5.

Thus, the dipole moments with opposite directions are generated between the first electrode 4 and the third electrode 3 and between the second electrode 5 and the third electrode 3 inside the multimode waveguide 2.

Since both the first electrode 4 and the second electrode 5 are arranged directly above the sites where the luminescent spots formed by multimode interference are generated in the multimode waveguide 2 when a voltage is not applied, most of the electric field passes through the regions where the luminescent spots formed by multimode interference are generated in the multimode waveguide 2, as shown in FIG. 15. Therefore, since a large dipole moment is generated even if the low voltage is applied to the first electrode 4 and the second electrode 5, the electro-optical property, for example, the refractive index of the relevant region of the multimode waveguide 2 greatly alters. Therefore, the optical mode field thereby greatly alters, the positions of the luminescent spots formed by multimode interference also greatly alter, and the optical path of the light that enters from the incident waveguides 1 also greatly alters.

Figure 18:
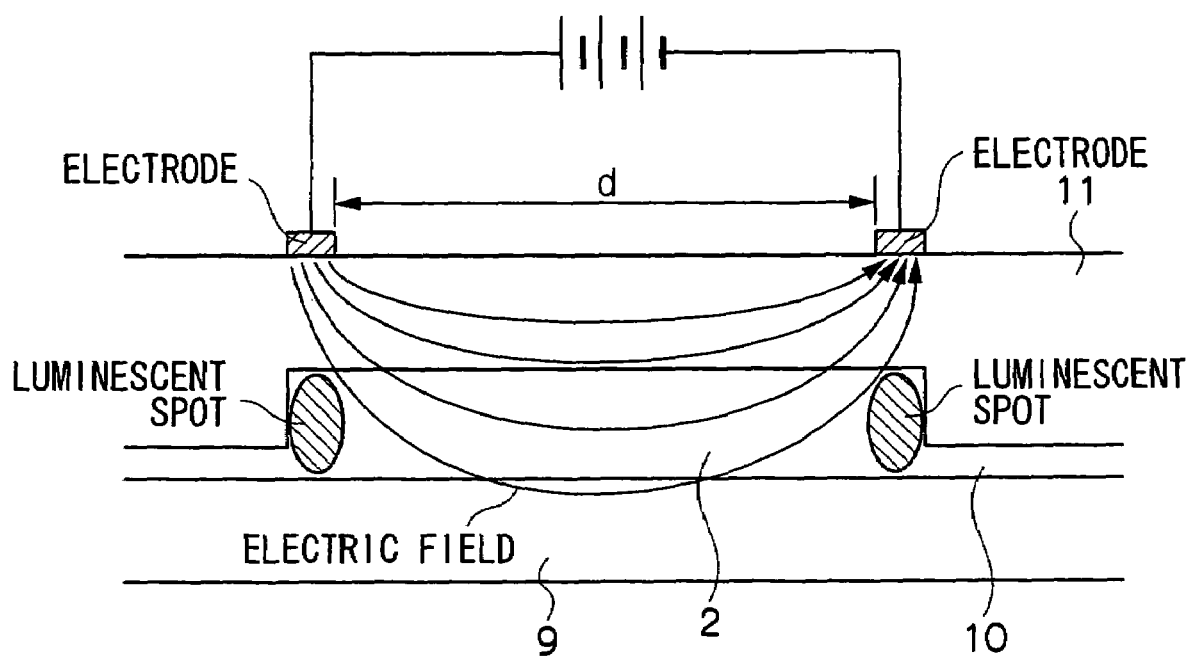
FIG. 18 is an explanatory view showing the positional relationship between the electric field generated by applying the voltage to the electrodes, and the luminescent spot formed by multimode interference produced in the multimode waveguide in the optical switching element of related art.

In the optical switching element of the related art, since the electrodes are arranged on one side of the multimode waveguide 2, as shown in FIG. 18, the electric field, generated by applying positive voltage to one electrode and applying the negative voltage to the other electrode, is formed along the surface of the multimode waveguide 2. Therefore, the electric field that passes through the region where the luminescent spots formed by multimode interference are generated in the multimode waveguide 2 is extremely small compared to the optical switching element 100 of the first embodiment.

In the optical switching element of the related art, since the electrodes are arranged on one side of the multimode waveguide 2, as shown in FIG. 18, the electric field, generated by applying positive voltage to one electrode and applying the negative voltage to the other electrode, is formed along the surface of the multimode waveguide 2. Therefore, the electric field that passes through the region where the luminescent spots formed by multimode interference are generated in the multimode waveguide 2 is extremely small compared to the optical switching element 100 of the first embodiment.

Therefore, the driving voltage may be as little as about 4V in the optical switching element 100, which is far lower than that of the optical switching element shown in FIG. 18.

Figure 16:
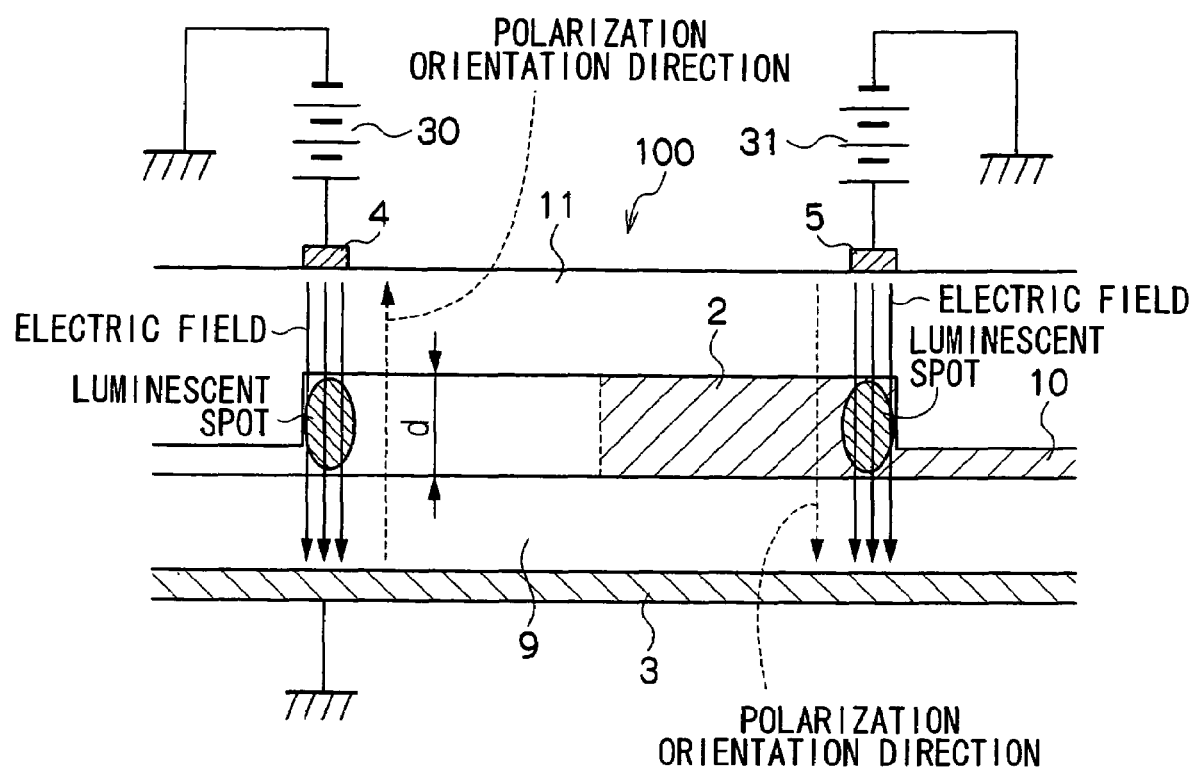
FIG. 16 is an explanatory view showing the positional relationship between the electric field generated by applying the voltage to the first electrode and the second electrode, and the luminescent spot formed by multimode interference produced in the multimode waveguide in the optical switching element of the first embodiment.

Furthermore, as shown in FIG. 7, if the polarization orientation process of opposite polarity is performed in the areas divided by the center line along the longitudinal direction of the multimode waveguide 2 as the boundary, that is, along the direction heading from the incident waveguides 1 to the outgoing waveguides 6, the dipole moments with opposite directions can be generated in the region between the first electrode 4 and the third electrode 3 and the region between the second electrode 5 and the third electrode 3 of the multimode waveguide 2, as shown in FIG. 16, by applying positive voltage to the first electrode 4 and the second electrode 5.

Figure 17:
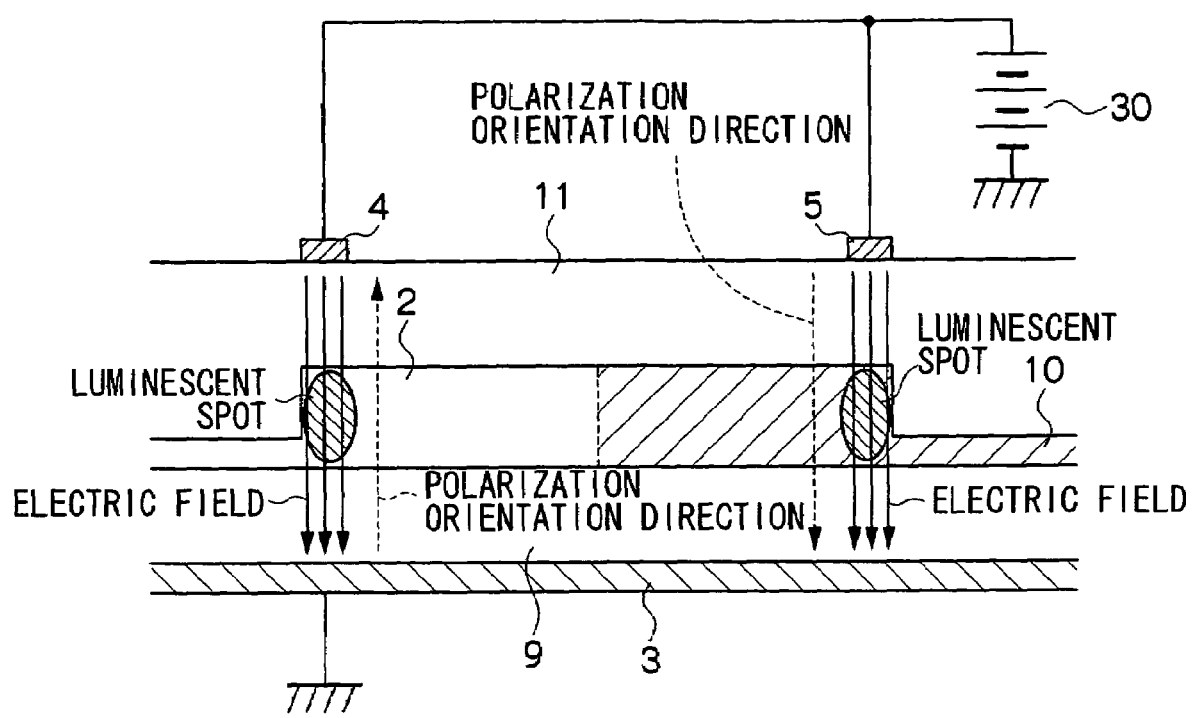
FIG. 17 is an explanatory view showing the positional relationship between the electric field generated by applying the voltage to the first electrode and the second electrode, and the luminescent spot formed by multimode interference produced in the multimode waveguide in the optical switching element of the first embodiment.

Therefore, since the direct current power source of the first electrode 4 and the direct current power source of the second electrode 5 can be integrated into one, as shown in FIG. 17, the configuration of the voltage application circuit can be simplified.

Furthermore, the driving voltage can be further lowered by forming plural of the first electrodes 4 and plural of the second electrodes 5 along the longitudinal direction of the multimode waveguide 2.

In addition, in the proposed optical switching element, that employs the MMI as an active element, similar to the related art, manufacturing of the waveguide becomes simple and the waveguide is also strong since the shape is simple.

(5) Optical Circuit

Figure 20A:
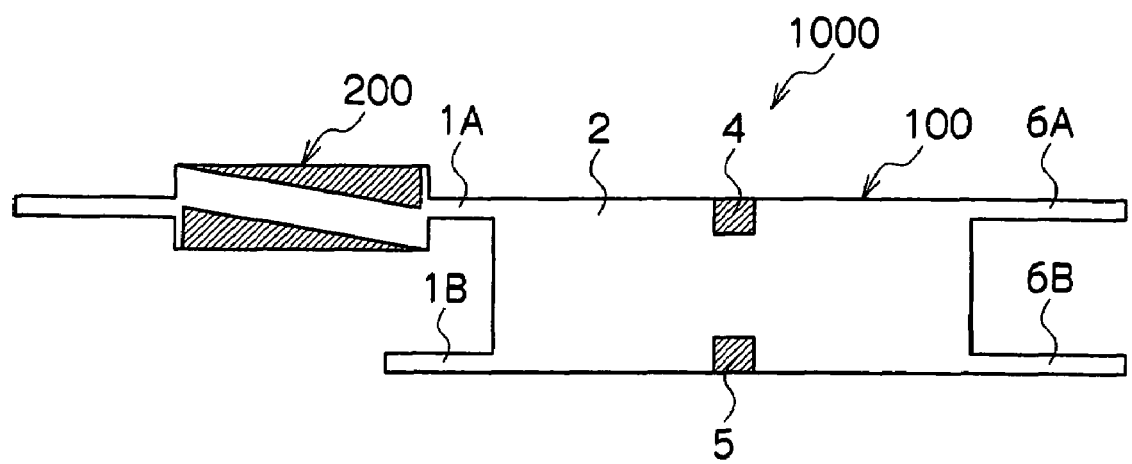
FIG. 20A is a schematic view showing one example of an optical circuit incorporating the optical switching element of the first embodiment.
Figure 20B:
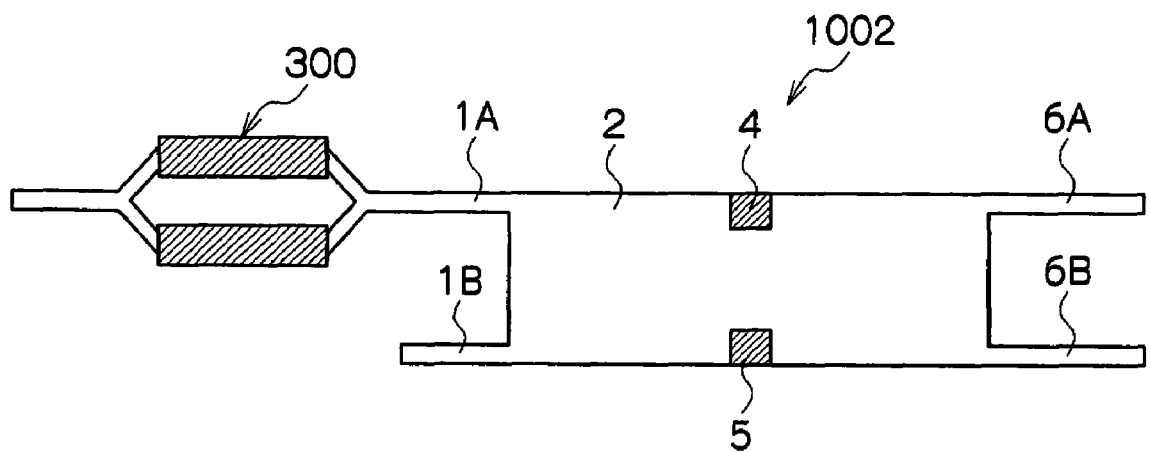
FIG. 20B is a schematic view showing one example of an optical circuit incorporating the optical switching element of the first embodiment.

Optical circuits incorporating the optical switching element 100 of the first embodiment includes: an optical circuit 1000 shown in FIG. 20A in which the MMI light modulating element 200 is connected to the incident waveguide 1A of the optical switching element 100; and an optical circuit 1002 shown in FIG. 20B in which a Mach-Zehnder light modulating element 300 is connected to the incident waveguide 1A of the optical switching element 100. The MMI light modulating element 200 is a light modulating element for modulating the light exiting from the outgoing waveguides, by arranging the electrodes on both sides of the multimode waveguide made of MMI, entering the light from the incident waveguides to the multimode waveguide and applying the electric signals to the electrodes to change the optical mode field of the multimode waveguide.

Figure 22:
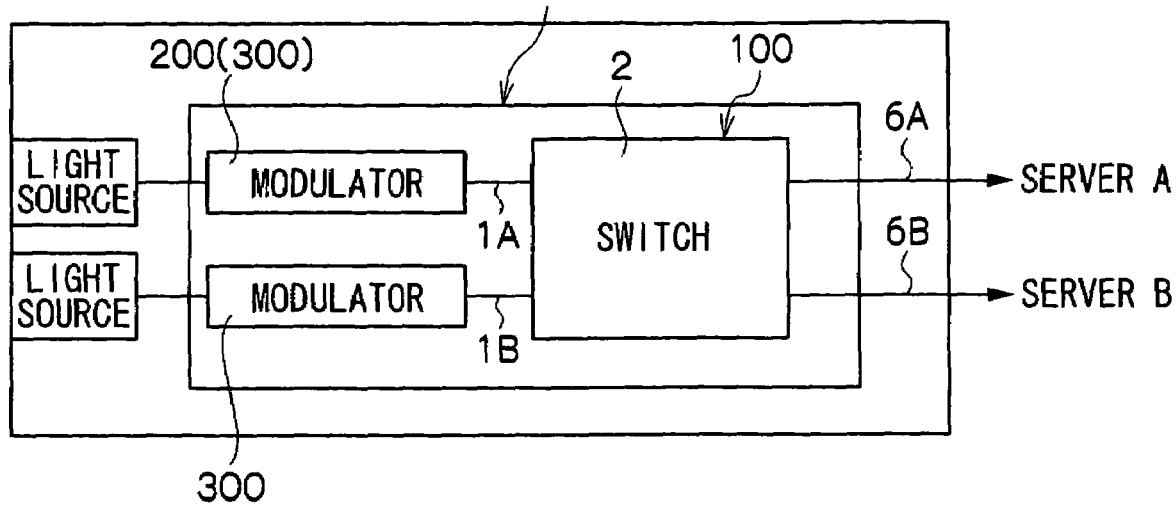
FIG. 22 is a schematic view showing another example of an optical circuits incorporating the optical switching element of the first embodiment.

The optical circuit may be an optical circuit 1004 shown in FIG. 22 in which the light modulating element is connected to both of the incident waveguides 1A and 1B of the optical switching element 100.

Figure 21:
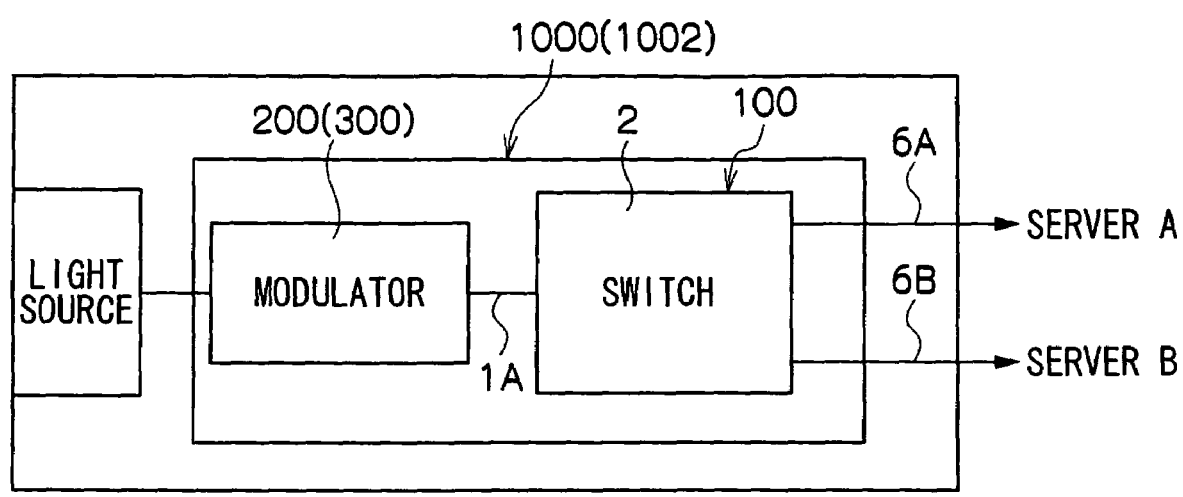
FIG. 21 is a schematic diagram showing an example of application of the optical circuit shown in FIGS. 20A and 20B.

In the optical circuits 1000 and 1002 shown in FIGS. 20A and 20B, the outgoing waveguide 6A of the optical switching element 100 is connected to a server A and the outgoing waveguide 6B is connected to a server B as shown in FIG. 21, and the optical signals, modulated by the MMI light modulating element 200 or the Mach-Zehnder light modulating element, can be switched between one of the server A and server B. Similarly, in the optical circuit 1004 shown in FIG. 22 as well, switching can be executed with the outgoing waveguide 6A of the optical switching element 100 connected to the server A and the outgoing waveguide 6B connected to the server B.

Figure 23:
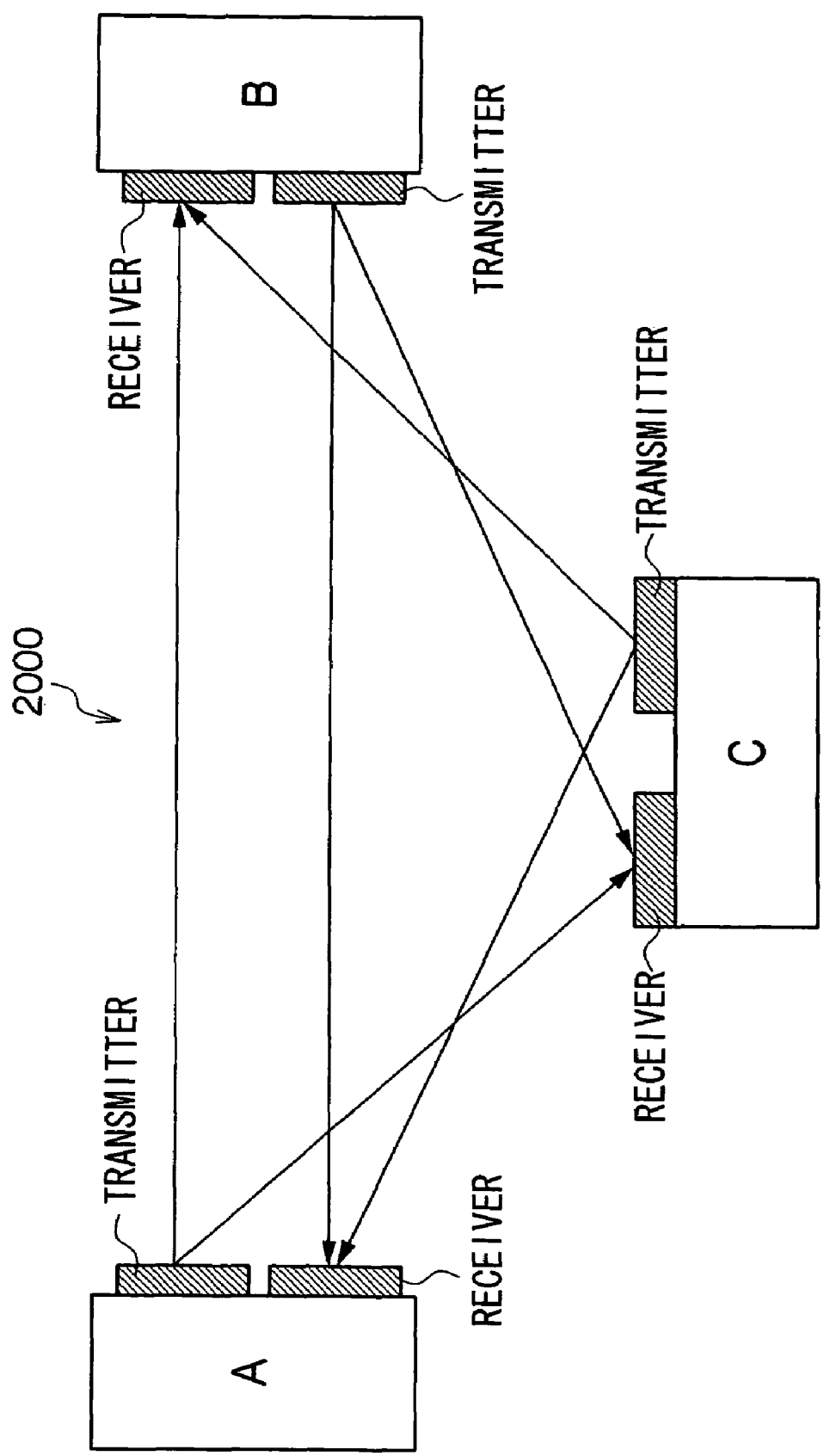
FIG. 23 is a schematic diagram showing one example of an optical communication system using the optical circuit shown in FIGS. 20 to 22.

Furthermore, the optical switching element 100 may be incorporated into a transmitter and a receiver of each optical communication systems A, B and C for transmitting and receiving an optical signal, as shown in FIG. 23.

EXAMPLE

The optical switching element 100 is formed according to the procedures shown in FIG. 19.

The third electrode 3 is formed by depositing gold on the substrate 7 through a VCD method. On the third electrode 3, an acrylic resin is spin coated and ultraviolet cured to form the lower cladding layer 9 with a thickness of 3.5 µm.

The resultant of dispersing Disperse-Red 1 or FTC (2-dicyanomethylene-3-cyano-4-{2-[trans-(4-N,N-diacetoxyethyl-amino)phenylene-3,4-dibutylene-5]vinyl}-5,5-dimethyl-2,5-dihydrofuran) in amorphous polycarbonate is spin coated onto the lower cladding layer 9, and then heating and curing are performed to form the core layer 10 with a thickness of 3.2 µm.

Subsequently, the incident waveguides 1A and 1B; the multimode waveguide 2; and the outgoing waveguides 6A and 6B are formed by etching the core layer. The width $W_1$ of the incident waveguides 1 and the outgoing waveguides 6 is 5 µm, and the width $W_2$ of the multimode waveguide 2 is 50 µm. Therefore, $W_2/W_1=10$. The length L of the multimode waveguide 2 is 11850 µm. The core layer 10 is etched such that the each peripheral portion of the incident waveguides 1, the multimode waveguide 2, and the outgoing waveguides 6 has a thickness of 2.6 µm.

After forming the incident waveguides 1, the multimode waveguide 2, and the outgoing waveguides 6 on the core layer 10, the acrylic resin, which is the same as that used in forming the lower cladding layer 9, is spin coated thereon and cured with ultraviolet. The refractive index of the lower cladding layer 9 and the upper cladding layer 11 is 1.471, and the refractive index of the core layer 10 is 1.5672.

After the upper cladding layer 11 is formed, gold is deposited thereon to form the seed electrode 13.

After the seed electrode 13 is formed, the voltage of 400 to 2000V is applied between the third electrode 3 and the seed electrode 13 at a high temperature of 90 to 250° C., and the third electrode 3 and the seed electrode 13 are left to be cooled to room temperature while being applied with the voltage so as to perform the polarization orientation process on the core layer 10.

After the polarization orientation process is finished, the seed electrode 13 is removed through etching, and the first electrode 4 and the second electrode 5 with a length of 100 μm and a width of 20 μm are formed through gold plating, thereby the optical switching element 100 is formed.

In the formed optical switching element 100, the light loss between the incident waveguides 1A and 1B and the single mode fiber, and the light loss between the single mode fiber and the outgoing waveguides 6A and 6B are both only 2.8 dB.

Moreover, the driving voltage $V_0$ is only 4(V). When the respective numbers of the first electrodes 4 and the second electrodes 5 is increased to two, as shown in FIG. 14, the driving voltage $V_0$ lowers to 2(V).

The foregoing descriptions of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical switching element comprising:
    a substrate;
    a lower cladding layer formed on the substrate;
    an upper cladding layer positioned above the lower cladding layer;
    a dielectric layer formed on the surface of the upper cladding layer and having a dielectric constant greater than the upper cladding layer,
    a multimode waveguide for propagating multimode light and having an electro-optical effect;
    one or a plurality of first single mode waveguides connected to one end of the multimode waveguide;
    a plurality of second single mode waveguides connected to the other end of the multimode waveguide;
    a first electrode arranged in the vicinity of one edge on one side of the multimode waveguide;
    a second electrode arranged in the vicinity of the other edge on the same side of the multimode waveguide;
    a third electrode arranged on the other side of the multimode waveguide; and
    a core layer sandwiched between the lower cladding layer and the upper cladding layer and formed with the multimode wave guide, the first single mode waveguide and the second single mode waveguide,
    wherein:
        the core layer has a refractive index greater than both of the upper cladding layer and the lower cladding layer,
        the first electrode and the second electrode the first electrode and the second electrode are formed on the surface of the dielectric layer, and
        the third electrode is formed between the substrate and the lower cladding layer,
        the first electrode and the second electrode are arranged to be positioned respectively on at least two of a plurality of luminescent spots formed by multimode interference apart from each other in an optical mode field generated by the light propagating through the multimode waveguide, and
        an optical path is switched between the first single mode waveguide and the second single mode waveguide by applying voltage between the first electrode and the third electrode and between the second electrode and the third electrode.

2. The optical switching element of claim 1, wherein a portion between the first electrode and the third electrode and a portion between the second electrode and the third electrode in the multimode waveguide are both subjected to a polarization orientation process by electric fields with the same direction to provide the electro-optical effect.

3. The optical switching element of claim 1, wherein a portion between the first electrode and the third electrode and a portion between the second electrode and the third electrode in the multimode waveguide are subjected to a polarization orientation process by electric fields with opposite directions to provide the electro-optical effect.

4. The optical switching element of claim 1, wherein the ratio $W_2/W_1$ of the width of the multimode waveguide with respect to the first single mode waveguide and the second single mode waveguide is $1<W_2/W_1<100$ where $W_1$ is the width of the first single mode waveguide and the width of the second single mode waveguide, and $W_2$ is the width of the multimode waveguide.

5. The optical switching element of claim 1, wherein the multimode waveguide is a waveguide of rib structure in which the core layer projects in a rib form towards the upper cladding layer.

6. The optical switching element of claim 1, wherein the multimode waveguide is a waveguide of inverse rib structure in which the core layer projects in a rib form towards the lower cladding layer.

7. The optical switching element of claim 1, wherein a seed electrode is formed above the upper cladding layer after forming the third electrode, the lower cladding layer, the core layer and the upper cladding layer on the substrate; and
    the core layer is subjected to a polarization orientation process by applying an electric field in the thickness direction between the seed electrode and the third electrode.

8. The optical switching element of claim 1, wherein the core layer is subjected to a polarization orientation process in advance, and the upper cladding layer and the lower cladding layer are formed on both surfaces of the core layer that has been subjected to the polarization orientation process.

* * * * *